US010271375B1

(12) United States Patent
Park

(10) Patent No.: US 10,271,375 B1
(45) Date of Patent: Apr. 23, 2019

(54) SYSTEMS AND METHODS FOR LATENCY REDUCTION FOR GROUP CALLS

(71) Applicant: Sprint Spectrum LP, Overland Park, KS (US)

(72) Inventor: Sunyong Park, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 8 days.

(21) Appl. No.: 15/726,346

(22) Filed: Oct. 5, 2017

(51) Int. Cl.
*H04W 76/00* (2018.01)
*H04W 76/40* (2018.01)
*H04L 29/06* (2006.01)
*H04W 74/00* (2009.01)
*H04W 74/08* (2009.01)
*H04W 76/22* (2018.01)
*H04W 76/11* (2018.01)
*H04L 12/18* (2006.01)

(52) U.S. Cl.
CPC ......... *H04W 76/40* (2018.02); *H04L 65/1069* (2013.01); *H04L 65/403* (2013.01); *H04W 74/006* (2013.01); *H04W 74/0833* (2013.01); *H04W 76/11* (2018.02); *H04W 76/22* (2018.02); *H04L 12/185* (2013.01)

(58) Field of Classification Search
None
See application file for complete search history.

(56) References Cited

U.S. PATENT DOCUMENTS

| 2015/0079979 | A1 | 3/2015 | Anchan | |
| 2017/0142756 | A1* | 5/2017 | Lee | H04W 76/45 |
| 2017/0289776 | A1* | 10/2017 | Kim | H04W 4/08 |
| 2017/0353273 | A1* | 12/2017 | Zhang | H04W 4/06 |
| 2018/0007545 | A1* | 1/2018 | Lee | H04W 8/245 |
| 2018/0234465 | A1* | 8/2018 | Kim | H04W 40/22 |
| 2018/0270891 | A1* | 9/2018 | Kim | H04W 76/19 |

* cited by examiner

*Primary Examiner* — Eunsook Choi

(57) ABSTRACT

Systems and methods are described for reducing latency for a group call. A group call random access (RACH) preamble selected from a subset of predetermined random access preambles associated with a group call may be received at an access node from a first wireless device, wherein the group call random access preamble indicates to the access node that a group call is to be established. A RACH response may be transmitted to the first wireless device comprising an uplink resource grant associated with a group call setup, wherein the uplink resource grant is greater than uplink resource grant associated with a default RACH response. And the group call may be established by communicating with the first wireless device based on the uplink resource grant associated with group call setup, wherein the group call is established between at least the first wireless device and a second wireless device.

20 Claims, 9 Drawing Sheets

SYSTEMS AND METHODS FOR LATENCY REDUCTION FOR GROUP CALLS

TECHNICAL BACKGROUND

Telecommunication systems, such as cellular networks or other wireless networks, rely on multiple network elements to provide reliable services for a plurality of wireless device. In some circumstances, a wireless device may request a group call such that a number of participants may be included on the call. Such a configuration may be beneficial in a professional setting, for planning purposes where a number of individuals are expected to participate on a call, or in other suitable circumstances. It may be beneficial for a system to consider efficient resource usage when establishing a group call requested by a user of the system.

OVERVIEW

Systems and methods are described for reducing latency for a group call. A group call random access (RACH) preamble selected from a subset of predetermined random access preambles associated with a group call may be received at an access node from a first wireless device, wherein the group call random access preamble indicates to the access node that a group call is to be established. A RACH response may be transmitted to the first wireless device comprising an uplink resource grant associated with a group call setup, wherein the uplink resource grant is greater than uplink resource grant associated with a default RACH response. And the group call may be established by communicating with the first wireless device based on the uplink resource grant associated with group call setup, wherein the group call is established between at least the first wireless device and a second wireless device.

DETAILED DESCRIPTION

In an embodiment, a group call may be established for a plurality of participant wireless devices. For example, a group call may be beneficial to organizations that seek a plurality of wireless device participants, for example to disseminate information useful to a number of members of the organization. Some implementations of group calling may be inefficient. For example, downlink data on a group call is often the same for the listening participants. Accordingly, a degree multicasting may be leveraged to enhance efficiency. However, such multicasting can involve network configuration and setup procedures, such as bearer establishment.

In an embodiment, random access procedures may not be configured to set up group calling functionality. For example, the resource grants associated with a default random access request may not be efficient for establishing a group call. In some embodiments, implementing a random access procedure to enhance group call setup can reduce latency for a group call and provide benefits to users of the system.

Figure 1:
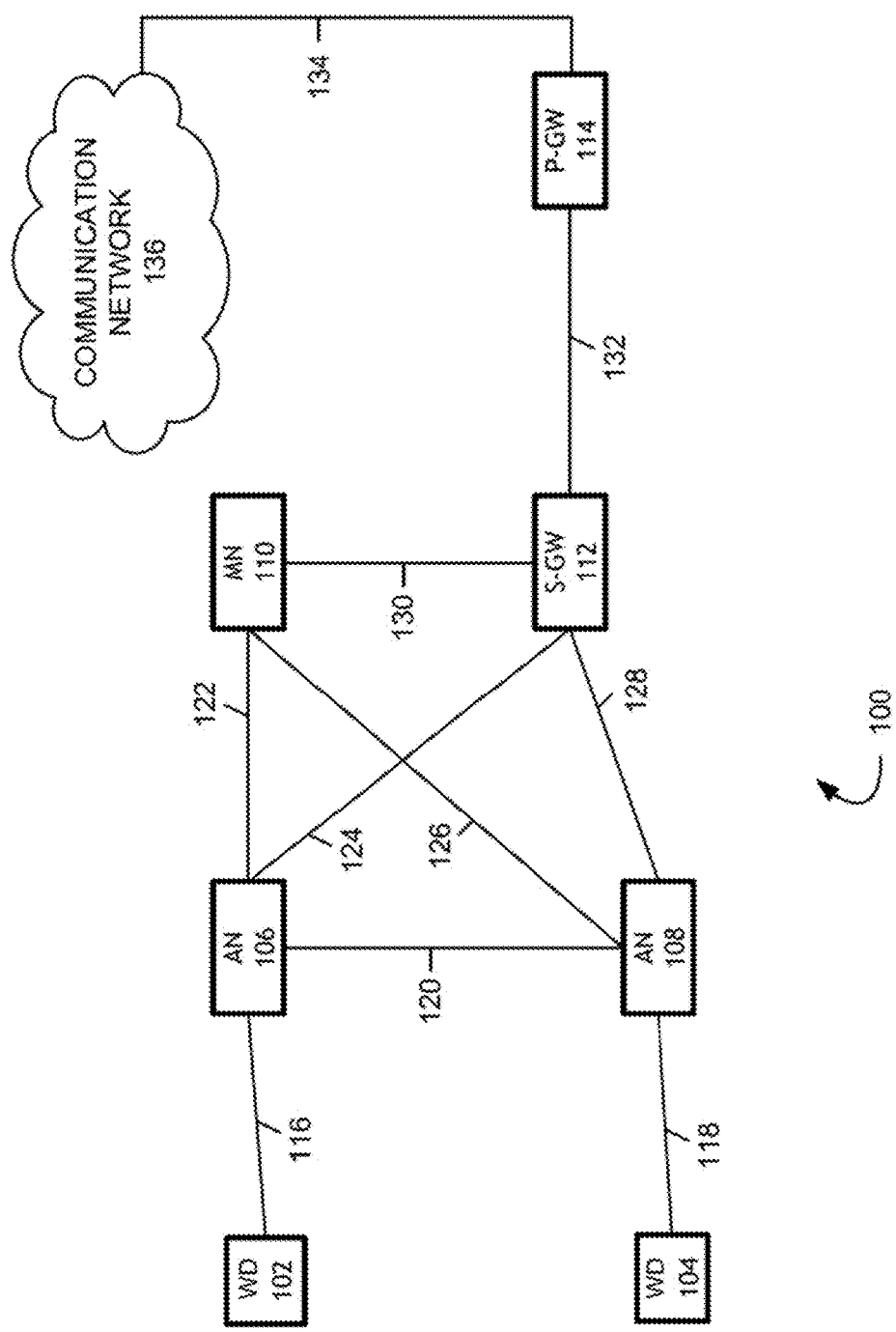
FIG. 1 illustrates an exemplary communication system to reduce latency for group calls.

FIG. 1 illustrates an exemplary communication system 100 to reduce latency for group calls comprising wireless devices 102 and 104, access nodes 106 and 108, management node 110, gateway nodes 112 and 114, and communication links 116, 118, 120, 124, 126, 128, 130, 132, and 134, and communication network 136. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106 and 108, management node 110, and gateway nodes 112 and 114 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with the depicted access nodes, any number of wireless devices can be implemented.

Access nodes 106 and 108 are network nodes capable of providing wireless communications to wireless device 102, and can be, for example, a base transceiver station, a radio base station, a small cell (e.g., picocell, femtocell, and the like) and an eNodeB device. Although only two access nodes are illustrated in FIG. 1, wireless devices 102 and 104 (and other wireless device not depicted) can be in communication with a plurality of access nodes and/or small cells. The plurality of access nodes and/or small cells can be associated with different networks and can support different communication protocols and radio access technologies.

Management node 110 can comprise a processor and associated circuitry to execute or direct the execution of computer-readable instructions to obtain information. Management node 110 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Management node 110 can receive instructions and other input at a user interface. Management node 110 can comprise a processor and associated circuitry to execute or direct the execution of computer-readable instructions to obtain information. In an embodiment, management node 110 can comprise a mobility management entity (MME) node.

Gateway nodes 112 and 114 are network elements which can comprise a processor and associated circuitry to execute or direct the execution of computer-readable instructions. Gateway node 112 and 114 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway nodes 112 and 114 can provide instructions to access nodes 106 and 108 related to channel selection in communications with wireless devices 102 and 104. In some embodiments, gateway nodes 112 and 114 may comprise a single node. Gateway nodes 112 and 114 can comprise at least one of a serving gateway (SGW), a packet data network gateway (PDNGW), a cellular gateway (CGW), and a combination thereof.

Communication network 136 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 136 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 136 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 136 may also comprise a wireless network, including base stations, wireless communication nodes, telephony switches, internet routers, network gateways, computer systems, communication links, or some other type of communication equipment, and combinations thereof.

Communication links 116, 118, 120, 124, 126, 128, 130, 132, and 134 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 106 may establish communication with wireless device 102 such that access node 106 provides the wireless device access to a communication network (e.g., communication network 136) and access node 108 may establish communication with wireless device 104 such that access node 108 provides the wireless device access to a communication network (e.g., communication network 136). In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, a group call may be established for a plurality of participant wireless devices. For example, a group call may be beneficial to organizations that seek a plurality of wireless device participants. Some implementations of group calling may be inefficient. For example, downlink data on a group call is often the same for the listening participants. Accordingly, a degree multicasting may be leveraged to enhance efficiency. Further, a plurality of access nodes may each include a plurality of wireless device participants. For example, access node 106 may be in communication with a plurality of wireless devices that comprise group call participants and access node 108 may be in communication with a plurality of wireless devices that comprise group call participants. Here, multicasting to each access node that includes a participant may further provide efficiency with regard to link resources.

In an embodiment, in order for an idle wireless device (e.g., one that does not comprise an active connection with an access node) to establish a group call, the wireless device first establishes a connection with an access node. For example, wireless device 102 may initiate a Random Access Procedure (e.g., RACH) in order to establish a connection with access node 106. The wireless device may transmit one or more messages over a Physical Random Access Channel (PRACH) in order to perform the RACH procedure.

In an embodiment, random access procedures may not be configured to set up group calling functionality. For example, the resource grants associated with a default RACH procedure may not be efficient for establishing a group call. In some embodiments, implementing a random access procedure to enhance group call setup can reduce latency for group calling and provide benefits to users of the system.

Figure 2:
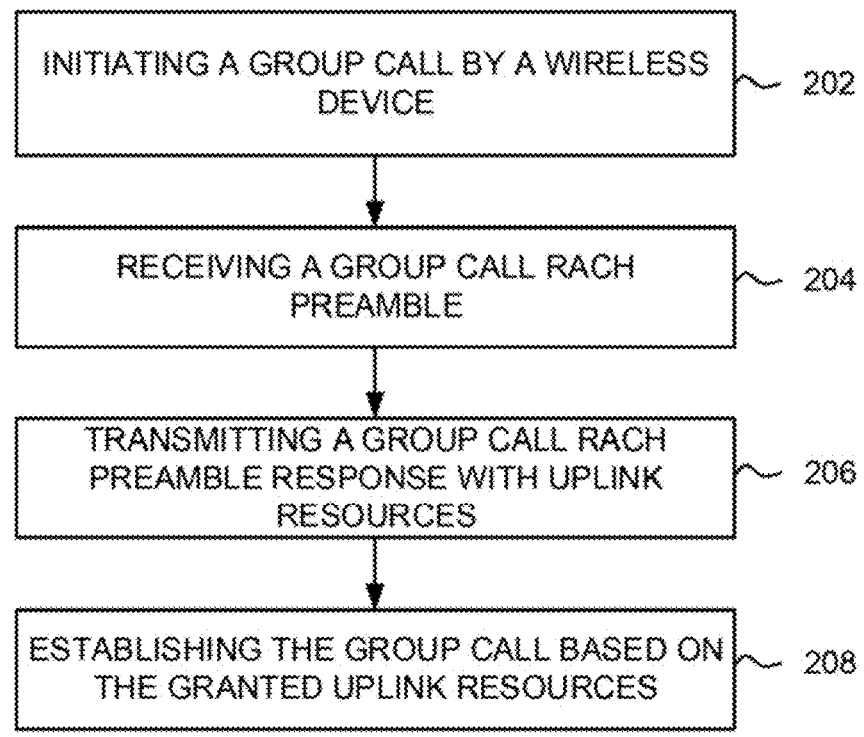
FIG. 2 illustrates an exemplary method for reducing latency for group calls.

FIG. 2 illustrates an exemplary method for reducing latency for group calling according to an embodiment. The method will be discussed with reference to the exemplary communication system 100 illustrated in FIG. 1, however, the method can be implemented with any suitable communication system.

Referring to FIG. 2, at step 202, a group call may be initiated by a first wireless device. For example, wireless device 102 may initiate a group call with wireless device 104. Both wireless devices 102 and 104 may be idle (e.g., do not comprise an active connection with an access node) prior to the initiation.

At step 204, a group call random access (RACH) preamble may be received from the wireless device at an access node that is selected from a subset of predetermined random access preambles associated with a group call, wherein the group call random access preamble indicates to the receiving access node that a group call is to be established. For example, a group call random access preamble may be received at access node 106 from wireless device 102. The group call random access preamble may be selected from a subset of RACH preambles that are associated with a group call setup.

At step 206, a RACH response may be transmitted from the access node that comprises an uplink resource grant associated with a group call setup, wherein the uplink resource grant is greater than uplink resource grant associated with a default RACH response. For example, access node 106 may be transmit a RACH response that includes uplink resources to be used to set up the group call. In an embodiment, the uplink resources may be greater (e.g., comprise a higher number of physical resource blocks) than a default RACH response uplink grant at least because setting up a group call may consume a greater number of resources than simply establishing a connection with an access node or setting up a default voice call.

At step 208, the group call may be established by communicating with the access node based on the uplink resource grant associated with a group call setup. For example, wireless device 102, access node 106, and a core network may communicate to establish the group call. Wireless device 102 and access node 106 may communicate based on the granted resources to achieve the setup of the group call.

Figure 3:
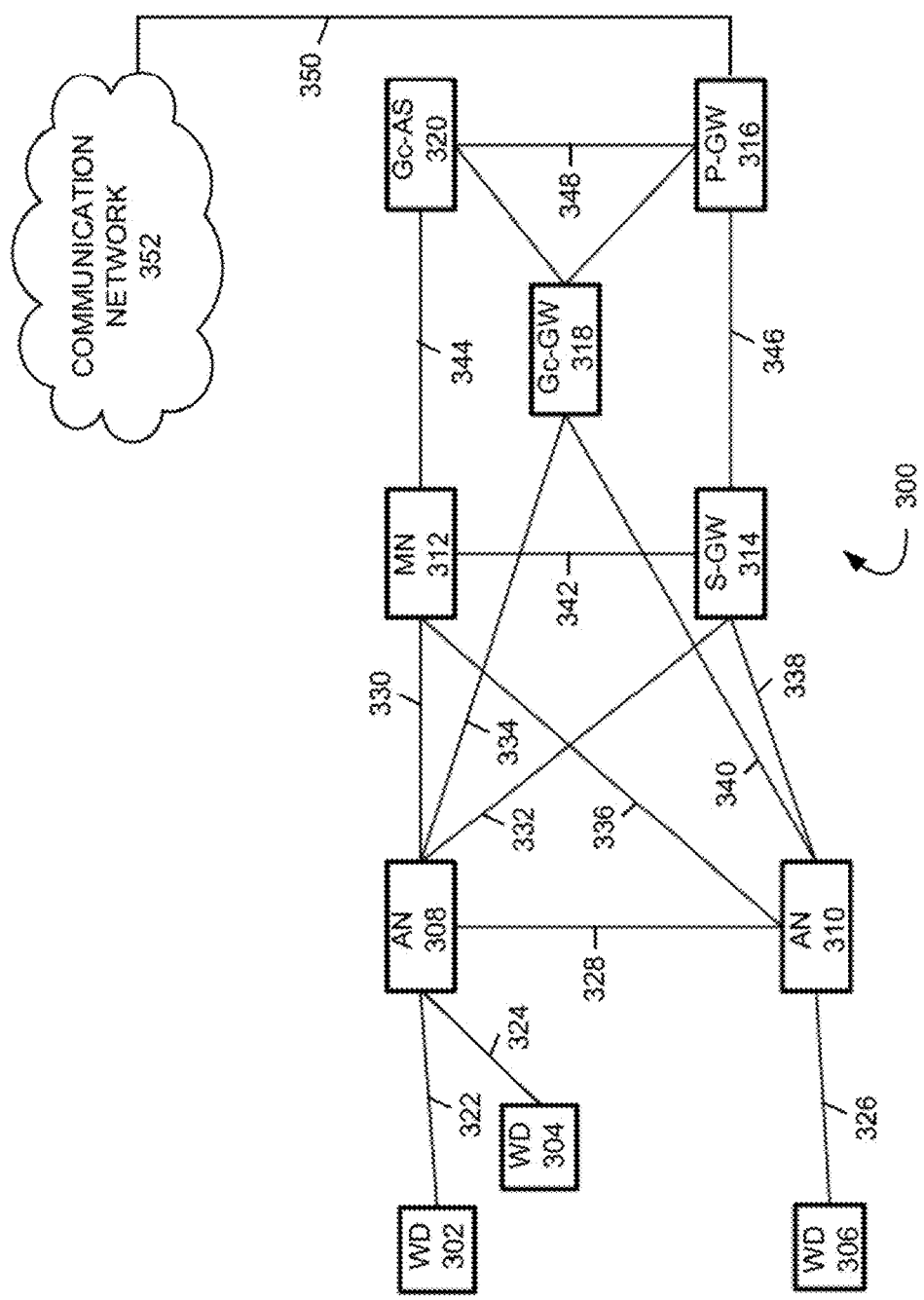
FIG. 3 illustrates another exemplary communication system to reduce latency for group calls.

FIG. 3 illustrates another exemplary communication system 300 to reduce latency for group calling. Communication system 300 may comprise wireless devices 302, 304, and 306, access nodes 308 and 310, management node 312, gateway nodes 314 and 316, group call gateway node 318, group call server node 320, communication network 352, and communication links 322, 324, 326, 328, 330, 332, 334, 336, 338, 340, 342, 344, 346, 348 and 350. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302, 304, and 306 can be any device configured to communicate over communication system 300 using a wireless communication link. For example, wireless devices 302, 304, and 306 can include a cell phone, a smart phone, a computing platform such as a laptop, palmtop, or a tablet, a personal digital assistant, or an internet access device, and combinations thereof. It is noted that while three wireless devices are illustrated in FIG. 3 as being in communication with the depicted access nodes, any number of wireless devices can be implemented.

Access nodes 308 and 310 are network nodes capable of providing wireless communications to wireless device 302, and can be, for example, a base transceiver station, a radio base station, a small cell (e.g., picocell, femtocell, and the like), and an eNodeB device. Although only two access nodes are illustrated in FIG. 3, wireless devices 302, 304, and 306 (and other wireless device not depicted) can be in communication with a plurality of access nodes and/or small cells. The plurality of access nodes and/or small cells can be associated with different networks and can support different communication protocols and radio access technologies.

Management node 312 can comprise a processor and associated circuitry to execute or direct the execution of computer-readable instructions to obtain information. Management node 312 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Management node 312 can receive instructions and other input at a user interface. In an embodiment, management node 312 comprises a controller node, a mobility management entity (MME) node, or any other suitable management node.

Gateway nodes 314 and 316 are network elements which can comprise a processor and associated circuitry to execute or direct the execution of computer-readable instructions. Gateway nodes 314 and 316 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway nodes 314 and 316 can provide instructions to access nodes 308 and 310 related to channel selection in communication with wireless devices 302, 304, and 306. In some embodiments, gateway nodes 314 and 316 may comprise a single node. Gateway nodes 314 and 316 can comprise at least one of a serving gateway (SGW), a packet data network gateway (PDNGW), a cellular gateway (CGW), and a combination thereof.

Group call server node 320 can comprise a processor and associated circuitry to execute or direct the execution of computer-readable instructions to obtain information. Group call server node 320 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Group call server node 320 can receive instructions and other input at a user interface. In some embodiments, management node 312 and group call server node 320 may comprise a single node.

Group call gateway node 318 is a network element which can comprise a processor and associated circuitry to execute or direct the execution of computer-readable instructions. Group call gateway node 318 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In some embodiments, gateway nodes 314 and 316 and group call gateway node 318 may comprise a single node.

Communication network 352 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 352 can be capable of carrying voice information and other information, for example, to support communications by a wireless device such as wireless device 302. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 352 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 352 may also comprise a wireless network, including base stations, wireless communication nodes, telephony switches, internet routers, network gateways, computer systems, communication links, or some other type of communication equipment, and combinations thereof.

Communication links 322, 324, 326, 328, 330, 332, 334, 336, 338, 340, 342, 344, 346, 348, and 350 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 308 may establish communication with wireless devices 302 and 304 such that access node 306 provides the wireless devices access to a communication network (e.g., communication network 352) and access node 310 may establish communication with wireless device 306 such that access node 310 provides the wireless device access to a communication network (e.g., communication network 352). In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, a group call may be established for a plurality of participant wireless devices. For example, a group call may be beneficial to organizations that seek a plurality of wireless device participants. However, some implementations of group calling may be inefficient. For example, downlink data on a group call is often the same for the listening participants. Accordingly, a degree multicasting may be leveraged to enhance efficiency. Further, a plurality of access nodes may each include a plurality of wireless device participants. For example, access node 308 may be in communication with a plurality of wireless devices that comprise group call participants and access node 310 may be in communication with a plurality of wireless devices that comprise group call participants. Here, multicasting to each access node that includes a participant may further provide efficiency with regard to link resources.

In an embodiment, in order for an idle wireless device (e.g., one that does not comprise an active connection with an access node) to establish a group call, the wireless device first establishes a connection with an access node. For example, wireless device 302 may initiate a Random Access Procedure (e.g., RACH) in order to establish a connection with access node 308. The wireless device may transmit one or more messages over a Physical Random Access Channel (PRACH) in order to perform the RACH procedure.

In an embodiment, random access procedures may not be configured to set up group calling functionality. For example, the resource grants associated with a default RACH procedure may not be efficient for establishing a group call. In some embodiments, implementing a random access procedure to enhance group call setup can reduce latency for group calling and provide benefits to users of the system.

In an embodiment, system 300 may perform a group call using LTE radio access technology and network elements. In such an embodiment, the wireless device, such as wireless device 302, may include group call applications or implement group call protocols. In some examples, the wireless device may include both a groupcast (multicast) data bearer and a unicast data bearer such that group call data is communicated over the groupcast bearer and control data (or other data) is communication over the unicast bearer. The wireless device may comprise multiple cell RNTI support.

In an embodiment, the access node, such as access node 308, may perform radio network layer management, radio network resource management, and transport network resource management for the group call communication with wireless devices. The access node may also perform radio network layer system information generation and management, and scheduling and transmission for group call communication with wireless devices.

In an embodiment, the management node, such as management node 110, may perform core network management, such as data bearer (E-RAB) setup, deletion, modification, and management. The management node may also perform NAS layer processing and relaying for group call communication and core related system information management and application layer system information relay for group call communication.

In an embodiment, gateway nodes, such as gateway nodes 314 and 316, may perform group communication control support, such as group call floor support. The gateway nodes may also manage EPS unicast and group call multicast bearers. In an embodiment, the group call gateway node, such as group call gateway node 318, may perform group call multicast bearer path management including transport network resource management. The group call gateway node may also perform unicast and multicast bearer handling and group call communication security enforcement.

Figure 4:
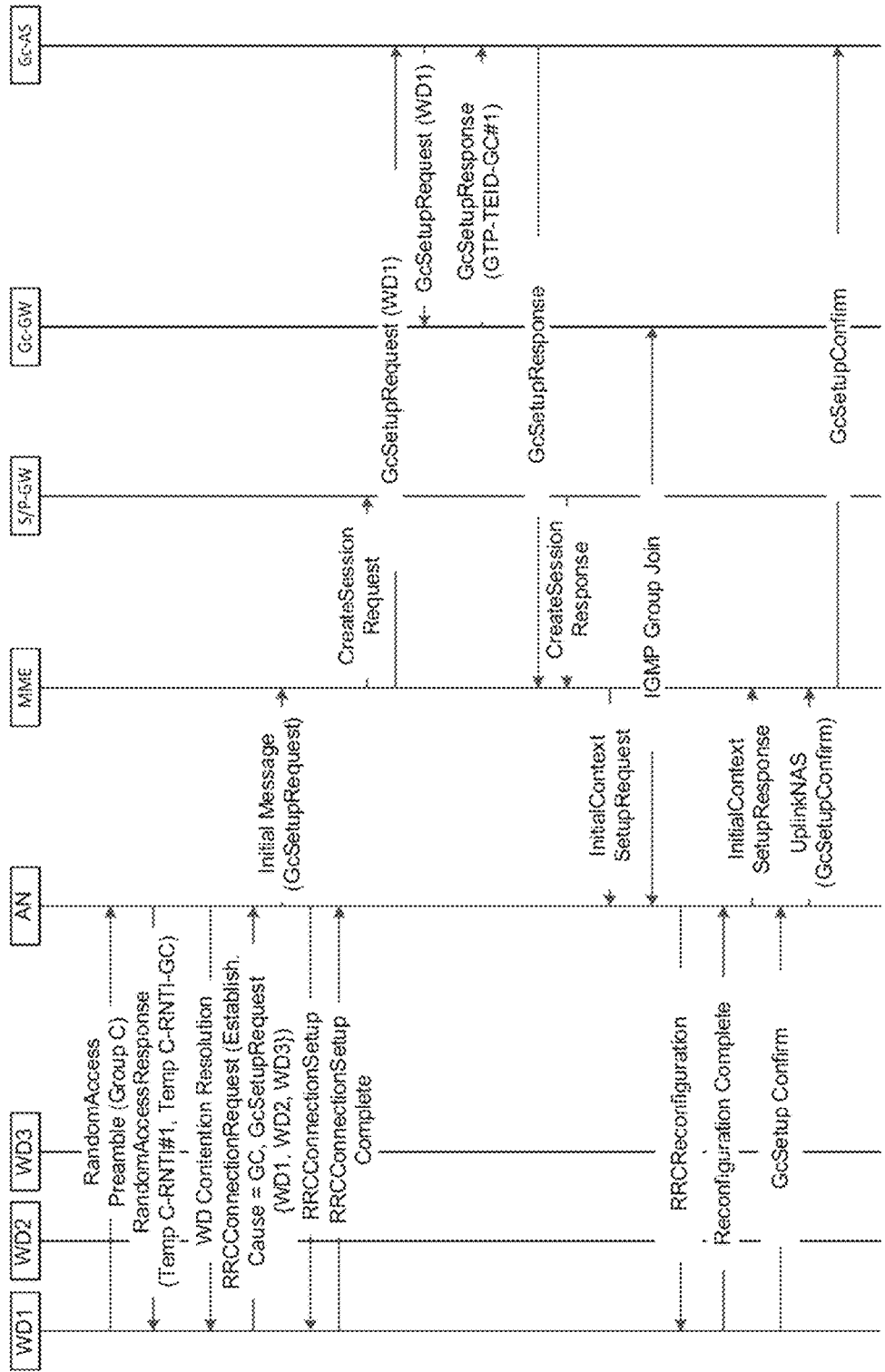
FIG. 4 illustrate an exemplary signaling flow for establishing a group call using a random access procedure.
Figure 5:
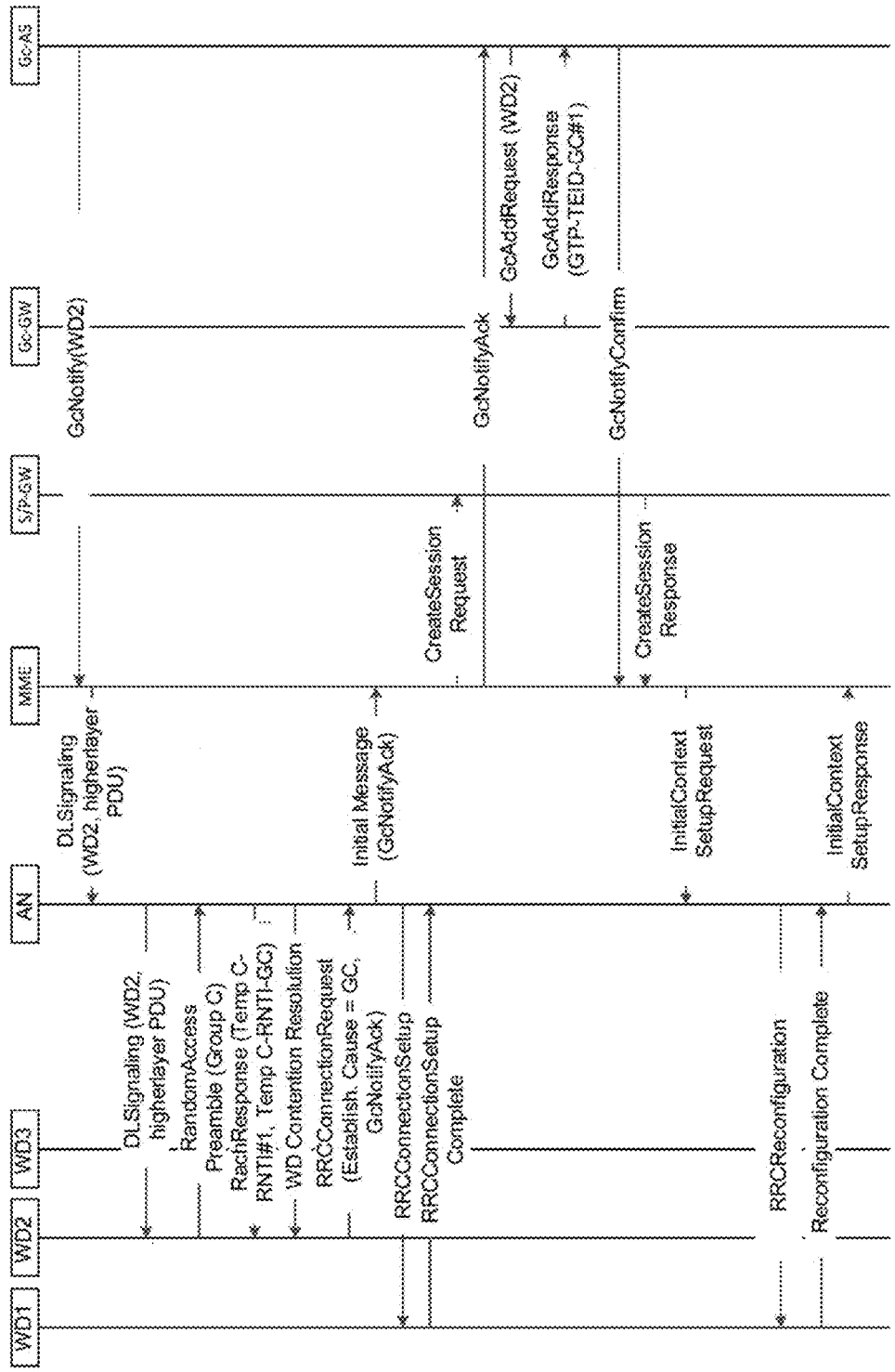
FIG. 5 illustrates another exemplary signaling flow for establishing a group call using a random access procedure.
Figure 6:
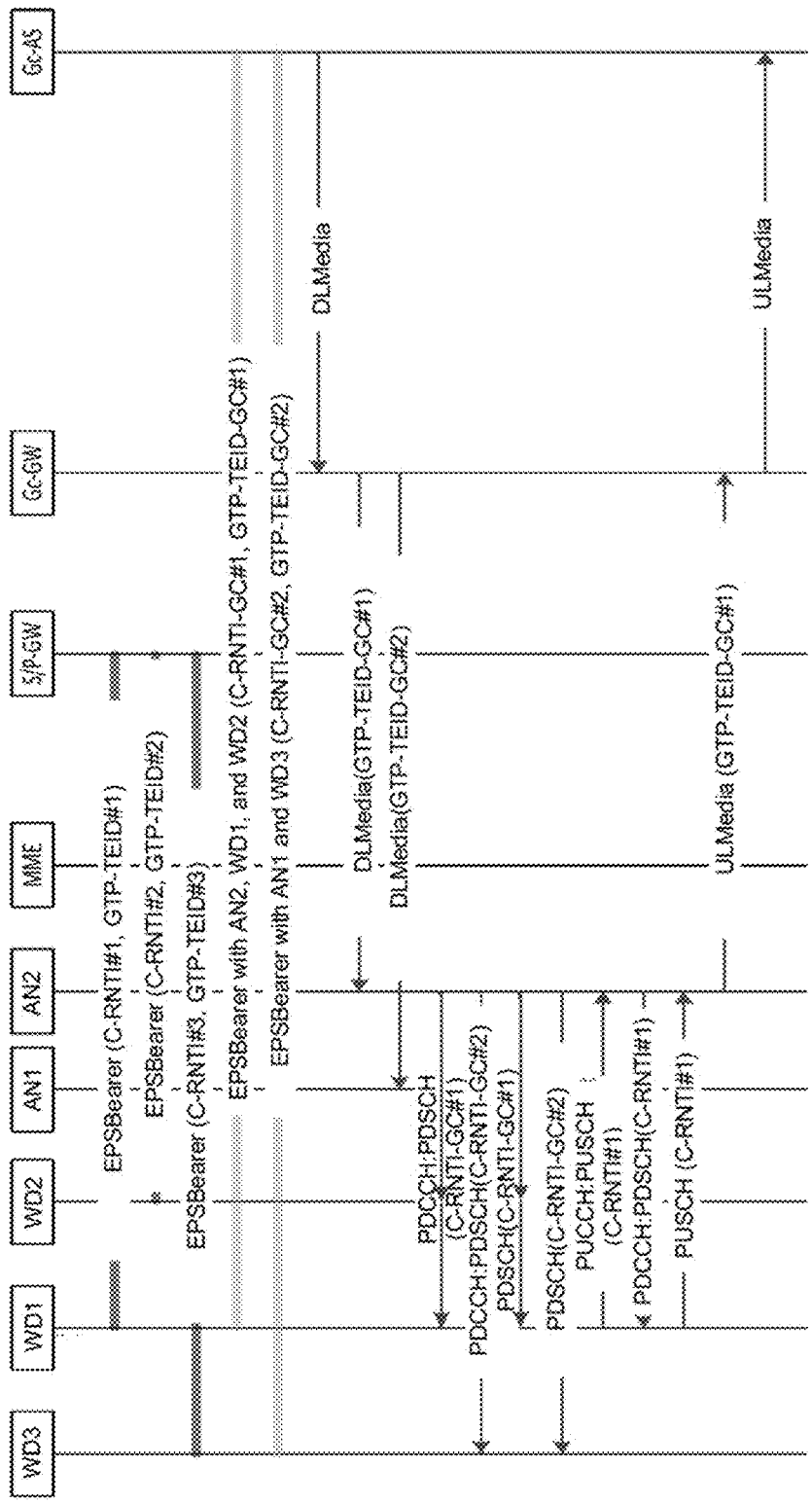
FIG. 6 illustrates an exemplary signaling flow for media flow in a group call.

In an embodiment, the group call application server node, such as group call application server node 320, may perform group call application layer management, such as group call setup, release, participant addition and removal, and floor control. The group call application server node may also perform group call media management, management of security keys for group calls, and group call application layer system information management. FIGS. 4-6 illustrate group call flows for various group call related functions.

FIG. 4 illustrates an exemplary group call flow for establishing a group call according to an embodiment. In the illustrated embodiment in FIG. 4, wireless device 1 and wireless device 2 may be in idle mode. The illustrated management node, gateway node, group call gateway node, and group call application server node may comprise a core network.

Wireless device 1 may transmit a random access preamble that indicates wireless device 1 requests to establish a connection with the access node for a group call. The random access preamble may comprise a preamble from a subset of preambles associated with establishing a group call (e.g., selected from a subset of group C preambles). In response, the access node may transmit a random access response to wireless device 1, where the response comprises two RNTIs or C-RNTIs for group call setup. The access node may also transmit a wireless device contention resolution message to configure the RRC connection with wireless device 1. Based on the received messages from the access node, wireless device 1 may transmit an RRC connection request message that indicates the connection request is for a group call and indicates the participants on the group call (e.g., wireless devices 1, 2, and 3). The access node and wireless device may then communicate to complete the RRC connection setup.

In response to receiving the RRC message from wireless device 1 to request a group call, the request may be relayed from the management node to the group call server node, and the group call server node and the group call gateway node may communicate and establish a group call identification for the requested group call. For example, the RRC connection request message from wireless device 1 may comprise a group call application layer message that indicates the group call setup request, and the access node, management node, group call server node, and group call gateway node may communicate based on the application layer message to setup the group call. In an embodiment, a group call setup response may be transmitted to the management node from the group call server node. The management node may then establish a multicast bearer with the access node for the group call. The access node may then send an Internet Group Management Protocol (IGMP) group join message to the group call gateway node to configure the established multicast bearer.

In an embodiment, group call data bearers (e.g., unicast bearer and multicast bearer) may be set up contemporaneously using a context setup message from the management node. The access node and wireless device may transmit MAC and RRC connection messages such that the data bearers for the group call are setup for wireless device 1. Once complete, an NAS message may be transmitted from the access node to the management node, and passed on to the group call server node such that the established group call is confirmed.

FIG. 5 illustrates an exemplary group call flow for joining a group call participant according to an embodiment. In the illustrated embodiment in FIG. 5, wireless device 2 may be in idle mode. The illustrated management node, gateway node, group call gateway node, and group call application server node may comprise the core network. Wireless device 2 may be joining the group call established by the group call flow illustrated in FIG. 4.

The group call server node may transmit a group call notify message to the management node that indicates wireless device 2 is to be notified (e.g., paged) about the group call. The management node may then send a DLSignalTransport message to the access node that includes indications of wireless device 2 and the group call identification for the group established group call. The access node may broadcast a DLSingalingTransfer message (e.g., group call paging message) to wireless device 2 that also includes indications of wireless device 2 and the group call identification for the established group call.

In response to the DLSignalingTransfer message, wireless device 2 may transmit a random access preamble that indicates wireless device 2 requests to establish a connection with the access node for a group call. The random access preamble may comprise a preamble from a subset of preambles associated with a group call (e.g., selected from a subset of C preambles). In response, the access node may transmit a random access response to wireless device 2, where the response comprises two RNTIs or C-RNTIs for group call setup. The access node may also transmit a wireless device contention resolution message to configure the RRC connection with wireless device 2. Based on the received messages from the access node, wireless device 2 may transmit an RRC connection request message that include an instruction to transmit an acknowledgement to the group call server node. The access node and wireless device may then communicate to complete the RRC connection setup.

In response to receiving the RRC message from wireless device 2, acknowledgement may be relayed to the group call server node, and the group call server node and the group call gateway may communicate to join wireless device 2 to the established group call. In an embodiment, a group call join acknowledgement may be transmitted to the management node from the group call server node. For example, the RRC connection message from wireless device 2 may comprise a group call application layer message that indicates a group call acknowledgment, and the access node, management node, group call server node, and group call gateway node may communicate based on the application layer message to join wireless device 2 to the group call.

In an embodiment, group call data bearers may be set up contemporaneously for wireless device 2 using a context setup message from the management node. The access node and wireless device 2 may transmit MAC and RRC connection messages such that the data bearers (e.g., unicast and multicast) for the group call are setup for wireless device 2. Once complete, and NAS message may be transmitted from the access node to the management node, and passed on to the group call server node such that the joining of wireless device 2 to the group call is confirmed.

FIG. 6 illustrates an exemplary group call flow for media flow for a group call according to an embodiment. In the illustrated embodiment, media is shared for a group call established between wireless devices 1, 2, and 3, where wireless devices 1 and 2 are in communication with access node 2 and wireless device 3 is in communication with access node 1. In an embodiment, EPS bearers have been established between wireless device 1, access node 2, and the core network, between wireless device 2, access node 2, and the core network, and between wireless device 3, access node 1, and the core network. In an embodiment, wireless devices 1, 2, and 3 comprise a unicast radio bearer and a multicast radio bearer, while access node 1 and access node 2 each comprise a multicast data bearer associated with the group call.

Downlink media data, such as group call voice data, may be transmitted from the group call server node to the group call gateway node and through the core network over the relevant multicast bearer to access nodes 1 and 2. Access nodes 1 and 2 may then schedule radio transmissions to wireless devices 1, 2 and 3 using a scheduler, such as a dynamic scheduler. Based on the scheduled transmissions, access nodes 1 and 2 may transmit the downlink media data to wireless devices 1, 2, and 3 using downlink transmissions (e.g., downlink physical resource blocks). The media may be transmitted to wireless devices 1, 2, and 3 using the multicast radio data bearer established between the wireless devices and the access nodes.

In an embodiment, wireless device 1 may comprise permission to transmit uplink media data (e.g., voice data) for the group call, or wireless device 1 may have the floor. Here, access node 2 may schedule an uplink transmission for wireless device 1, and according to the schedule, wireless device 1 may transmit the uplink data to access node 2. The media may be transmitted from wireless device 1 to access node 2 over a physical uplink shared channel (PUSCH). The uplink data may then be transmitted from access node 2 to the group call server node over the established bearer for the group call (e.g., multicast bearer).

Figure 7:
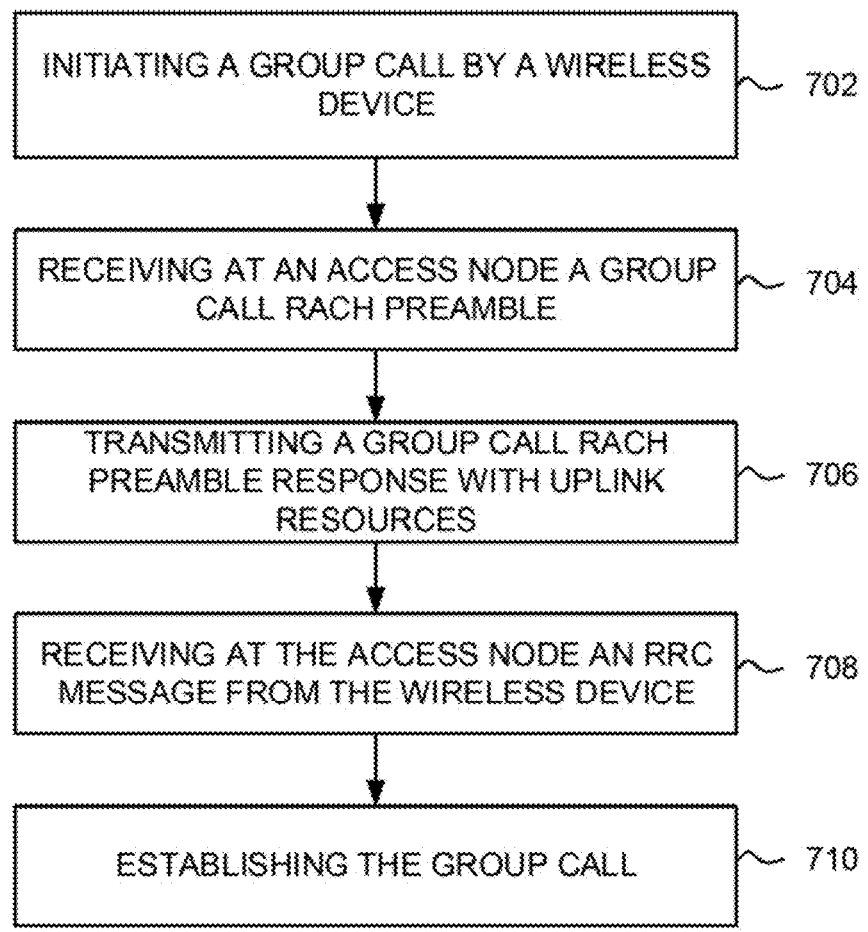
FIG. 7 illustrates another exemplary method for reducing latency for group calls.

FIG. 7 illustrates an exemplary method for reducing latency for group calls according to an embodiment. The method will be discussed with reference to the exemplary communication system 300 illustrated in FIG. 3, however, the method can be implemented with any suitable communication system.

Referring to FIG. 7, at step 702, a group call may be initiated by a first wireless device. For example, wireless device 302 may initiate a group call with wireless devices 304 and 306. In an embodiment, wireless devices 302 and 304 may be idle (e.g., do not comprise an active connection with an access node) prior to the initiation. In an embodiment, the initiation of a group call may comprise receiving, from the user of wireless device 302, an instruction to establish a group call with wireless devices 304 and 306. Software running on wireless device 302 may then commence procedures to establish a connection with an access node such that the group call may be performed.

At step 704, a group call random access (RACH) preamble may be received from the wireless device at an access node that is selected from a subset of predetermined random access preambles associated with a group call, wherein the group call random access preamble indicates to the receiving access node that a group call is to be established. For example, a group call random access preamble may be received at access node 306 from wireless device 302. The group call random access preamble may be selected from a subset of RACH preambles that are associated with a group call setup.

In an embodiment, a RACH configuration that includes random access preamble groups A, B, and C may be implemented from among a predetermined number of random access preambles, such as 64 generated preambles. In an example implementing RACH preamble groups A and B, if sizeOfRA-PreamblesGroupA is equal to numberOfRA-Preambles then there is no random access preamble group B. The preambles in preamble group A are the preambles (0 to sizeOfRAPreamblesGroupA-1) and, if it exists, the preambles in Random Access Preamble group B are (the preambles sizeOfRA-PreamblesGroupA to numberOfRA-Preambles-1). In an example implementing RACH preambles groups A, B, and C, size of Preambles Group C=numberOfRA-Preambles-sizeOfRA-Preambles-GroupA-sizeOfRA-PreamblesGroupB.

In an embodiment, a wireless device may select a preamble from preamble groups A and B for a default connection (e.g., to answer to page for a default voice call), where the wireless device decides to choose between groups A and B based on a size for uplink packets to be transmitted during the RACH procedure. In an embodiment, preambles from Group A are used for smaller size packets or larger size packets in poor radio conditions and preambles from Group B are used for larger size packets in good radio conditions.

In an embodiment, a wireless device may select a preamble from group C to establish a group call. For example, wireless device 302 and access node 308 may be configured such that wireless device 302 transmits a preamble from group C when requesting to establish a connection for a group call and access node 308 may be configured such that receiving a preamble from group C indicates that a wireless device is requesting to establish a connection for a group call (e.g., rather than a default connection associated with preambles from groups A and B). In an embodiment, wireless device 302 may select a preamble from group C based on conditions for the wireless device. For example, wireless device 302 selects a preamble from group C for a group call if group C exists (e.g., determined based on received SIB messages from the access node), and a pathloss is less than $P_{CMAX,c}$ (of the serving cell performing the Random Access Procedure)-preambleInitialReceivedTargetPower-deltaPreambleMsg3-Extended-messagePowerOffsetGroupC. In an embodiment, the below data structure may outline a RACH configuration that implements a preamble associated with a group call (e.g., preamble Group C).

```
RACH-ConfigCommon : :=      SEQUENCE {
    preambleInfo                SEQUENCE {
        numberOfRA-Preambles        ENUMERATED {
                                        n4, n8, n12, n16, n20, n24, n28, n32,
                                        n36, n40, n44, n4S, n52, n56, n60, n64},
    preamblesGroupAConfig       SEQUENCE {
        sizeOfRA-PreamblesGroupA    ENUMERATED {
                                        n4, n8, n12, n16, n20, n24, n28,
                                        n32, n36, n40, n44, n48, n52,
                                        n56, n60},
        messageSizeGroupA           ENUMERATED {b56, b144, b208,
                                        b256},
        messagePowerOffsetGroupB    ENUMERATED {
                                        minusinfinity, dB0, dB5, dB8,
                                        dB10, dB12, dB15, dB18},
    . . .
    }       OPTIONTAL                                           -- Need OP
    preambleGroupCConfig        SEQUENCE {
        sizeOfRA-PreambleGroupB     ENUMERATED {
            n4, n8, n12, n16, n20, n24, n28, n32, n36, n40, n44, n48, n52,
            n56, n60),
        messagePowerOffsetGroupC            ENUMERATED {
            minusinfinity, dBO, dB5, 6B8, dB10, dB12, dB15, dB18, dB20, dB23,
            dB25, dB30}
        OPTIOANAL                                               -- Need OP
    },
    UplinkPowerControlCommon: : =SEQUENCE{
        p0-NominalPUSCH             INTEGER (-126. .24),
        alpha                       Alpha-r12,
        p0-NominalPUCCH             INTEGER (-127. .-96),
```

-continued

```
deltaFList-PUCCH              DeltaFList-POCCH,
deltaPreambleMsg3             INTEGER (−1. .6)
deltaPreambleMsg3-Extended    INTEGER (−1. .30)
}
```

At step 706, a RACH response may be transmitted from the access node that comprises an uplink resource grant associated with a group call setup, wherein the uplink resource grant is greater than uplink resource grant associated with a default RACH response. For example, access node 306 may transmit a RACH response that includes uplink resources to be used to set up the group call. In an embodiment, the uplink resources may be greater (e.g., comprise a higher number of physical resource blocks) than a default RACH response uplink grant at least because setting up a group call may consume a greater number of resources than establishing a connection with an access node or setting up a default voice call.

In an embodiment, where a default RACH preamble (from among groups A or B) is received, access node 308 may grant a first amount of uplink resources and one RNTI or C-RNTI in the RACH response message to be used by the wireless device to establish a connection. In an embodiment where a RACH preamble associated with a group call is received (e.g., from among Group C), access node 308 may grant a second amount of uplink resources and two RNTI or C-RNTI in the RACH response message to be used by the wireless device to establish a connection. For example, the second amount of uplink resource (e.g., physical resource blocks) may be greater than the first amount of uplink resources. In an illustrative example, the first amount of uplink resource may comprise 4, 8, or more resource blocks while the second amount of uplink resources may comprise 10, 12, or more resource blocks.

In an embodiment, a RACH response from access node 308 to a preamble from Group C may be defined by the following data structure:

| Octet | 8 | 7 | 6 | 5 | 4 | 3 | 2 | 1 |
|---|---|---|---|---|---|---|---|---|
| 1 | R | | Timing Advance Command | | | | | |
| 2 | | Timing Advance Command (cont.) | | | | UL Grant | | |
| 3 | UL Grant (cont.) | | | | | | | |
| 4 | UL Grant (cont.) | | | | | | | |
| 5 | Temporary C-RNTI | | | | | | | |
| 6 | Temporary C-RNTI | | | | | | | |
| 7 | Temporary C-RNTI-GC | | | | | | | |
| 8 | Temporary C-RNTI-GC | | | | | | | |

At step 708, a radio resource control (RRC) message may be received from the wireless device that comprises an indication of the group call. For example, wireless device 302 may transmit an RRC message that comprises an indication for the group call in response to the RACH response from access node 308.

For example, the RRC message may indicate to access node 308 that a group call connect is requested to be established by wireless device 302. The RRC message may also indicate the remaining participants for the group call (e.g., wireless devices 304 and 306). In an embodiment, the RRC message from wireless device 302 may include data defined by the following data structure:

```
-- ASN1START
RRCConnectionRequest : : =        SEQUENCE {
    criticalExtensions                CHOICE {
        rrcConnectionRequest-r8           RRCConnectionRequest-r8-IEs,
        criticalExtensionsFuture          SEQUENCE { }
    }
}
RRCConnectionRequest-r8-IEs : :=  SEQUENCE {
ue-Identity                           InitialUE-Identity,
establishmentCause                    EstablishmentCause,
rrcConnectionRequest-GC               RRCConnectionRequest-GC-IE,
spare                                 BIT STRING (SIZE (1))
}
InitialUE-Identity : :=           CHOICE {
    s-TMSI                                S-TMSI,
    randomValue                           BIT STRING (SIZE (40))
}
EstablishmentCause : :=           ENUMERATED {
                                      emergency, highPriorityAccess, mt-Access, mo-
                                      Signalling,
                                      mo-Data, delayTolerantAccess-v1020,
                    public-safety-gc, commercial-gc, gc-mt-access, spare8, spare7, spare6,
                    spare5, spare4, spare3, spare2, spare1}
RRCConnectionRequest-GC-IEs: :=   SEQUENCE {
    selectedPLMN-Identity                 INTEGER (1. .maxPLMN-rll),
    registeredMME                         RegisteredMME
    OPTIONAL,
    dedicatedinfoNAS                      DedicatedInfoNAS,
    dedicatedinfoGenericNAS               DedicatedGenericNAS,
    nonCriticalExtension Future           SEQUENCE { }
    OPTIONAL,
}
--ASN1STOP
```

At step 710, the group call may be established in response to the received RRC message. For example, wireless device 302, access node 308, and a core network may communicate to establish the group call based on the received RRC message from wireless device 302.

FIG. 4 illustrates a call flow for establishing a group call according to embodiments described herein. Communications between wireless device 302, access node 308, management node 312, gateway nodes 314 and 316, group call gateway node 318, and group call server node 320 may be similar to those illustrated in FIG. 4. For example, wireless device 302 and access node 308 may exchange messages (e.g., RRC messages) to setup a connection. Access node 308 may relay a message to group call server node 320 requesting that the group call be established. Group call server node 320 and group call gateway node 318 may communicate to establish the group call, assign participants or a subscription for the group call (e.g., wireless devices 302, 304, and 306), and assign a GroupCommunicaiton-GroupIdentity (GCGI) (e.g., group call identifier) for the group call.

Group call server node 320 may then communicate with management node 312 to establish a data bearer for the group call. For example, the data bearer may comprise a multicast data bearer, where group call data for multiple wireless devices in communication with an access node may be carried between the core network and the access node over the multicast data bearer.

Management node 312 and access node 308 may communicate to establish radio bearers for wireless devices 302 for the group call. For example, management node 312 may assign the radio bearers with an initial context setup request. Access node 310 may then transmit RRC messages with wireless device 302 to establish the radio bearers. A unicast radio bearer and a multicast radio bearer may be established for wireless device 302, where the unicast bearer may be used to communicate control information and the multicast bearer may be used to communicate group call data (e.g., voice data). Once the setup is complete confirmation messages may be transmitted to management node 312 and group call server node 320.

In an embodiment, once the group call has been established for wireless device 302, participant wireless devices may be joined to the established group call. Some participant wireless devices may comprise an active connection to an access node, and thus may perform a group call join using the active connection. Other group call participants may be in idle mode, and thus may perform a RACH procedure to join the group call.

Figure 8:
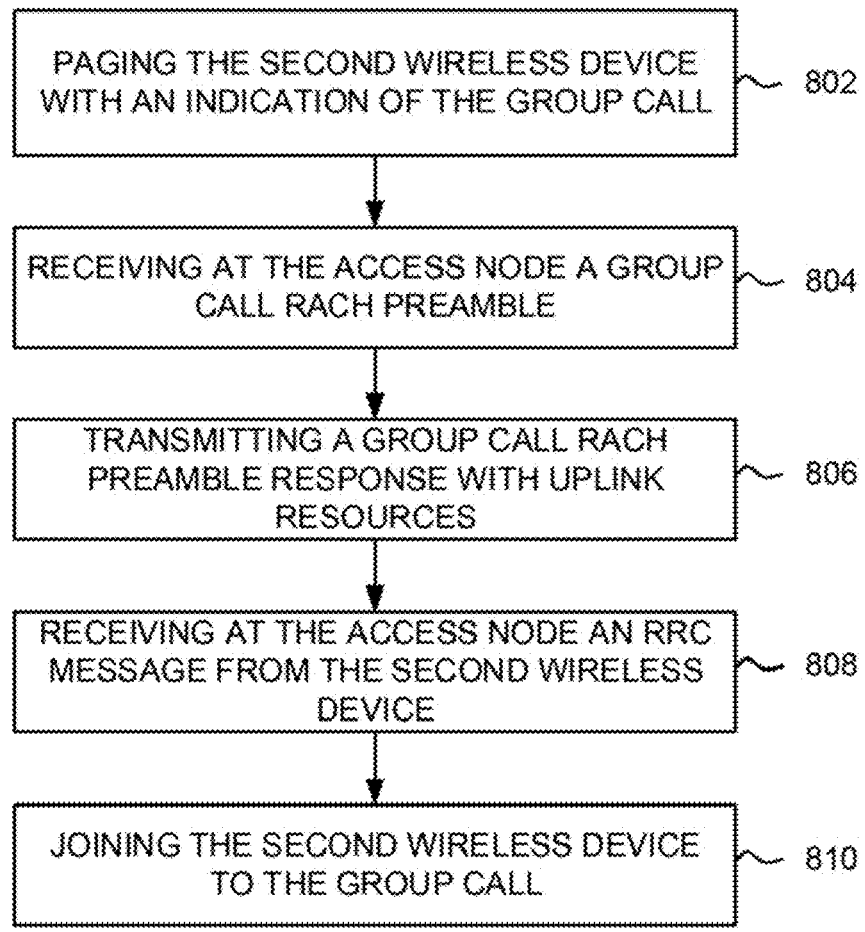
FIG. 8 illustrates another exemplary method for reducing latency for group calls.

FIG. 8 illustrates another exemplary method for reducing latency for group calls according to an embodiment. The method will be discussed with reference to the exemplary communication system 300 illustrated in FIG. 3, however, the method can be implemented with any suitable communication system. In an embodiment, the method of FIG. 8 may follow the method of FIG. 7, where wireless device 302 has requested that a group call be established. For example, the method of FIG. 8 describes a process for joining an idle participant wireless device to the established group call.

Referring to FIG. 8, at step 802, a second wireless device may be paged, the page comprising an indication of the group call. For example, wireless device 304 may be paged based on the group call request from wireless device 302. The page may indicate that the call request comprises a group call request.

In an embodiment, group call server node 320 may transmit a group call notify message to management node 312 that indicates wireless device 304 is to be notified (e.g., paged) about the group call. Management node 312 may then send a DLSignalTransport message to access node 308 that includes indications of wireless device 304 and the GCGI for the group established group call.

In an embodiment, access node 308 may broadcast a DLSingalingTransfer message (e.g., group call paging message) that also includes indications of wireless device 304 and the GCGI for the established group call. In an embodiment, the RRC DLSingalingTransfer message broadcast from access node 308 may include data defined by the following data structure:

```
-- ASN1START
DLSignalingTransfer : :=    SEQUENCE {
   signalingRecordList          SEQUENCE (SIZE (1. .maxSignalingRec)) of
SignalingRecord
     nonCriticalExtension       OCTET STRING          OPTIONAL
                                                      OPTIONAL, -- Need ON
}
SignalingRecord : :=SEQUENCE {
   pagingIdentity               PagingIdentity,
   higherLayerPDU               HigherLayerPDU
}
PagingIdentity : :=             CHOICE {
   ue-Identity                               PagingUE-Identity,
   groupCommunicationGroup-Identity          GroupCommunicationGroupIdentity
}
HigherLayerPDU : := OCTET STRING (SIZE (1..maxhigherlayerPDULength))
PagingUE-Identity : :=          CHOICE {
   s-TMSI                                    s-TMSI,
   imsi                                      IMSI,
   . . .
}
GroupCommunicationGroupIdentity :: = SEQUENCE {
   plmn-Identity                             PLMN-Identity,
   groupCommunicationServiceIdentity         GroupCommunicationServiceIdentity
}
IMSI: :=                        SEQUENCE (SIZE (6. .21)) OF IMSI-Digit
IMSI-Digit : : =                INTEGER (0. .9)
PLMN-Identity : :=              SEQUENCE {
   mcc                                       MCC           OPTIONAL, -- Cond MCC
```

```
    mnc                                         MNC
}
MCC ::=                                         SEQUENCE (SIZE (3)) OP MCC-MNC-Digit
MNC ::=                                         SEQUENCE (SIZE (2. .3)) OP MCC-MNC-Digit
MCC-MNC-Digit ::=                               INTEGER (0. .9)
GroupCommunicationServiceidentinty : : =        INTEGER (0. .16777215)
maxSignalingRec : :=16
maxhigherlayerPDULength : :=1446
-- ASN1STOP
```

At step 804, a group call random access (RACH) preamble may be received from the second wireless device at the access node that is selected from a subset of predetermined random access preambles associated with a group call, wherein the group call random access preamble indicates to the receiving access node that a group call is to be established. For example, a group call random access preamble may be received at access node 308 from wireless device 304. In an embodiment, wireless device 304 transmits the group call preamble based on the indication for a group call request received with the paging message. The group call random access preamble may be selected from a subset of RACH preambles that are associated with a group call setup.

In an embodiment, the format of the DLSignalingTransfer message (e.g., paging message) and the indication of the group call (such as the GCGI) may indicate to wireless device 304 that the paging request correspond to a group call. Based on this indication, wireless device 304 may select a preamble from Group C to transmit to access node 308 such that the access node proceeds with resource grants and procedures for a group call connection rather than a default random access connection (e.g., for a default voice call). The transmission of a preamble selected from Group C by wireless device 304 to access node 308 may be similar to the preamble transmission by wireless device 302.

At step 806, a RACH response may be transmitted from the access node that comprises an uplink resource grant associated with a group call setup, wherein the uplink resource grant is greater than uplink resource grant associated with a default RACH response. For example, access node 308 may transmit a RACH response that includes uplink resources to be used to set up the group call. In an embodiment, the uplink resources may be greater than (e.g., comprise a higher number of physical resource blocks) a default RACH response uplink grant at least because setting up a group call may consume a greater number of resources than simply establishing a connection with an access node or setting up a default voice call.

In an embodiment, where a default RACH preamble (from among preamble groups A or B) is received, access node 308 may grant a first amount of uplink resources and one RNTI or C-RNTI in the RACH response message to be used by the wireless device to establish a connection. In an embodiment where a RACH preamble associated with a group call is received (e.g., from among Group C), access node 308 may grant a second amount of uplink resources and two RNTIs or C-RNTIs in the RACH response message to be used by the wireless device to establish a connection. For example, the second amount of uplink resource (e.g., physical resource blocks) may be greater than the first amount of uplink resources. The RACH response transmitted by access node 308 to wireless device 304 may be similar to the response transmitted to wireless device 302.

At step 808, a radio resource control (RRC) message may be received from the wireless device that comprises an indication of the group call. For example, wireless device 304 may transmit an RRC message to access node 308 that comprises an indication of the group call to be joined. The RRC message may indicate to access node 308 that a group call connect is requested by wireless device 304 and may include a group call acknowledgement message (e.g., to be relayed to group call server node 320).

At step 810, the wireless device may be joined to the group call. For example, wireless device 304, access node 308, and a core network may communicate to establish radio data bearers for the group call based on the received RRC such that wireless device 304 joins the group call.

FIG. 5 illustrates a call flow for joining a wireless device to a group call according to embodiments described herein. Communications between wireless device 304, access node 308, management node 312, gateway nodes 314 and 316, group call gateway node 318, and group call server node 320 may be similar to those illustrated in FIG. 5. For example, in response to receiving the RRC message from wireless device 304, acknowledgement may be relayed to group call server node 320, and group call server node 320 and group call gateway node 318 may communicate to join wireless device 304 to the established group call. In an embodiment, the RRC connection message from wireless device 304 may comprise a group call application layer message that indicates a group call acknowledgment, and access node 308, management node 312, group call server node 320, and group call gateway node 318 may communicate based on the application layer message to join wireless device 304 to the group call.

In an embodiment, group call data bearers may be set up contemporaneously for wireless device 304 using a context setup message from management node 312. Access node 308 and wireless device 304 may transmit MAC and RRC connection messages such that the data bearers for the group call are setup for wireless device 304 (e.g., unicast and multicast data bearers). Once complete, an NAS message may be transmitted from access node 308 to the management node 312, and passed on to group call server node 320 such that the joining of wireless device 304 to the group call is confirmed.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 9:
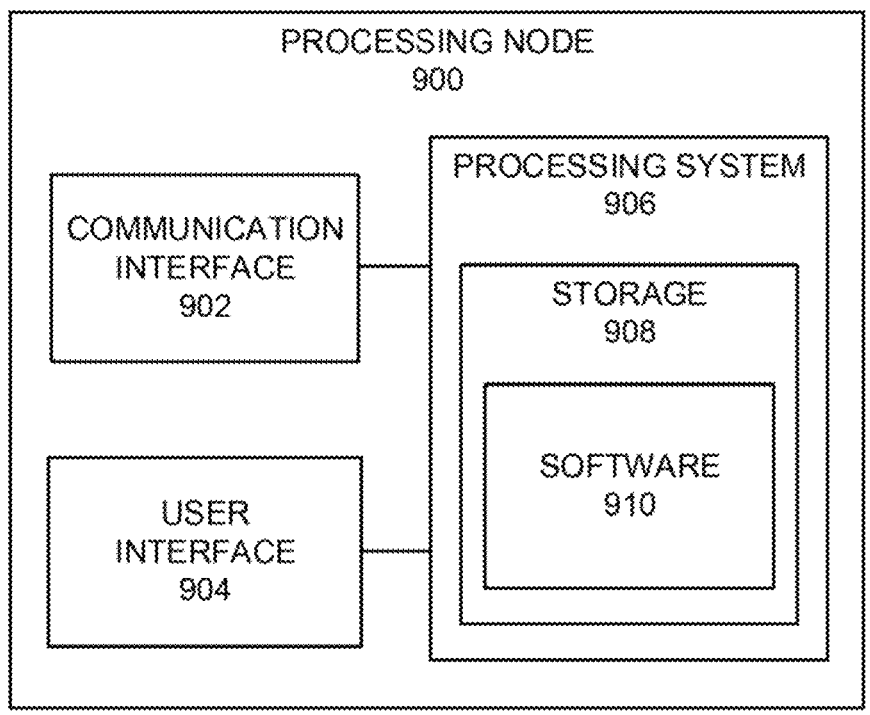
FIG. 9 illustrates an exemplary processing node.

FIG. 9 illustrates an exemplary processing node 900 in a communication system. Processing node 900 comprises communication interface 902, user interface 904, and processing system 906 in communication with communication interface 902 and user interface 904. Processing node 900 can be configured to determine a communication access node for a wireless device. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 include management node 312, group call server node 320, and gateway nodes 314, 316, and 318. Processing node 900 can also be an adjunct or component of a network element, such as an element of access nodes 106, 108, 308, or 310 and the like. Processing node 900 can also be another network element in a communication system. Further, the functionality of processing node 900 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for reducing latency for a group call, the method comprising:
   receiving from a first wireless device at an access node a group call random access (RACH) preamble selected from a subset of predetermined random access preambles associated with a group call, wherein the group call random access preamble indicates to the access node that a group call is to be established;
   transmitting from the access node a RACH response to the first wireless device comprising an uplink resource grant associated with a group call setup, wherein the uplink resource grant is greater than uplink resource grant associated with a default RACH response; and
   establishing the group call by communicating with the first wireless device based on the uplink resource grant associated with group call setup, wherein the group call is established between at least the first wireless device and a second wireless device.

2. The method of claim 1, wherein the RACH response from the access node further comprises two cell radio network temporary identifiers (C-RNTI), at least one of the C-RNTIs being associated with the group call.

3. The method of claim 1, further comprising:
   receiving, from the first wireless device and based on the RACH response, at the access node a radio resource control (RRC) message that comprises a group call connection request.

4. The method of claim 3, wherein the received RRC message indicates that the second wireless device comprises a participant for the requested group call.

5. The method of claim 3, wherein, in response to the RRC message, the access node transmits a group call setup request message to one or more group call nodes that comprise a core network.

6. The method of claim 5, wherein the received RRC message from the second wireless device comprises a group call application layer message that indicates the group call setup request.

7. The method of claim 1, further comprising:
   paging the second wireless device, wherein the page comprises an indication of a group call request.

8. The method of claim 7, further comprising:
   receiving, from the second wireless device at the access node, a second group call random access (RACH) preamble selected from the subset of predetermined random access preambles based on the indication of the group call request.

9. The method of claim 8, further comprising:
   transmitting from the access node a second RACH response comprising an uplink resource grant associated with group call setup based on the second preamble from the subset of predetermined preambles, wherein the uplink resource grant is greater than an uplink resource grant associated with a default RACH response.

10. The method of claim 9, wherein the second RACH response from the access node further comprises two cell radio network temporary identifiers (C-RNTI), at least one of the C-RNTIs being associated with the group call.

11. A system for reducing latency for a group call, the system comprising:
    an access node with a processor configured to:

receive from a first wireless device a group call random access (RACH) preamble selected from a subset of predetermined random access preambles associated with a group call, wherein the group call random access preamble indicates to the access node that a group call is to be established;

transmit a RACH response to the first wireless device comprising an uplink resource grant associated with a group call setup, wherein the uplink resource grant is greater than uplink resource grant associated with a default RACH response; and establish the group call by communicating with the first wireless device based on the uplink resource grant associated with group call setup, wherein the group call is established between at least the first wireless device and a second wireless device.

12. The system of claim 11, wherein the RACH response from the access node further comprises two cell radio network temporary identifiers (C-RNTI), at least one of the C-RNTIs being associated with the group call.

13. The system of claim 11, wherein the access node is further configured to:

receive, from the first wireless device and based on the RACH response, a radio resource control (RRC) message that comprises a group call connection request.

14. The system of claim 13, wherein the received RRC message indicates that the second wireless device comprises a participant for the requested group call.

15. The system of claim 13, wherein, in response to the RRC message, the access node transmits a group call setup request message to one or more group call nodes that comprise a core network.

16. The system of claim 15, wherein the received RRC message from the second wireless device comprises a group call application layer message that indicates the group call setup request.

17. The system of claim 11, wherein the access node is further configured to:

page the second wireless device, wherein the page comprises an indication of a group call request.

18. The system of claim 17, wherein the access node is further configured to:

receive, from the second wireless device, a second group call random access (RACH) preamble selected from the subset of predetermined random access preambles based on the indication of the group call request.

19. The system of claim 18, wherein the access node is further configured to:

transmit from the access node a second RACH response comprising an uplink resource grant associated with group call setup based on the second preamble from the subset of predetermined preambles, wherein the uplink resource grant is greater than an uplink resource grant associated with a default RACH response.

20. The system of claim 19, wherein the second RACH response from the access node further comprises two cell radio network temporary identifiers (C-RNTI), at least one of the C-RNTIs being associated with the group call.

* * * * *